United States Patent
Ciesinger et al.

(10) Patent No.: US 7,000,071 B2
(45) Date of Patent: Feb. 14, 2006

(54) METHOD FOR VIRTUALLY ENLARGING THE STACK OF A PORTABLE DATA CARRIER

(75) Inventors: Daniel Ciesinger, München (DE); Thomas Frey, Ebersberg (DE); Martin Merck, Wurzburg (DE); Thomas Stocker, München (DE)

(73) Assignee: Giesecke & Devrient, Munich (DE)

( * ) Notice: Subject to any disclaimer, the term of this patent is extended or adjusted under 35 U.S.C. 154(b) by 272 days.

(21) Appl. No.: 10/344,565

(22) PCT Filed: Aug. 21, 2001

(86) PCT No.: PCT/EP01/09664

§ 371 (c)(1),
(2), (4) Date: Jul. 2, 2003

(87) PCT Pub. No.: WO02/19264

PCT Pub. Date: Mar. 7, 2002

(65) Prior Publication Data

US 2004/0015664 A1    Jan. 22, 2004

(30) Foreign Application Priority Data

Aug. 22, 2000 (DE) ................................ 100 40 974

(51) Int. Cl.
*G00F 12/00* (2006.01)

(52) U.S. Cl. ........................ 711/115; 711/103; 711/115; 711/165; 712/202

(58) Field of Classification Search ................ 711/103, 711/115, 165; 712/202
See application file for complete search history.

(56) References Cited

U.S. PATENT DOCUMENTS

| | | | | |
|---|---|---|---|---|
| 4,180,854 A | * | 12/1979 | Walden et al. | 708/130 |
| 4,833,595 A | | 5/1989 | Yasuo | |
| 5,386,560 A | * | 1/1995 | McCauley et al. | 711/165 |
| 5,809,241 A | | 9/1998 | Hänel et al. | |
| 5,893,121 A | * | 4/1999 | Ebrahim et al. | 707/206 |
| 5,950,221 A | * | 9/1999 | Draves et al. | 711/100 |
| 6,006,323 A | * | 12/1999 | Ma et al. | 712/202 |
| 6,226,202 B1 | * | 5/2001 | Kikuchi | 365/185.33 |
| 6,687,800 B1 | | 2/2004 | Nassor | |

FOREIGN PATENT DOCUMENTS

| | | |
|---|---|---|
| DE | 196 26 337 A | 1/1997 |
| EP | 0 354 793 A | 2/1990 |
| EP | 0 720 087 A1 * | 3/1996 |
| FR | 2 777 673 A | 10/1999 |
| WO | WO 98 52160 A | 11/1998 |

* cited by examiner

*Primary Examiner*—Donald Sparks
*Assistant Examiner*—Hashem Farrokh
(74) *Attorney, Agent, or Firm*—Bacon & Thomas, PLLC

(57) ABSTRACT

A method is proposed for virtual enlargement of the stack of a portable data carrier allowing reloading of executable program code. To permit the execution of programs requiring a larger stack than that physically present, the stack is segmented into at least two stack segments and their fill state monitored. When complete occupation of a segment is recognized, the oldest stack segment is swapped out to a further storage medium. The further storage medium is a nonvolatile read-write memory that can be a slower memory compared to the stack. When sufficient memory space is available in the stack again, the swapped out segment is returned. The method includes managing a destination address of each stack segment swapped out to the nonvolatile read-write memory in a register in a volatile read-write memory.

16 Claims, 2 Drawing Sheets

METHOD FOR VIRTUALLY ENLARGING THE STACK OF A PORTABLE DATA CARRIER

BACKGROUND

This invention relates to a method for virtual enlargement of the data structure of a fast read-write memory on a portable data carrier, and relates further to a portable data carrier with a microcontroller consisting at least of a processor, an I/O unit, a fast read-write memory with a stack, a slow read-write memory, an operating system and at least one data, control and address bus.

Portable data carriers are known e.g. in the form of smart cards. The latter are characterized in that they have an integrated circuit incorporated in the card body and equipped with means for data transfer and storage and with a unit for processing said data. To protect the chip from damage by breakage or torsion and for security reasons the area of the chip is kept small. It has proved advantageous in practice to choose a square area of 25 mm$^2$ if possible. The chip located on the smart card with all its modules, in particular its memory modules, is therefore greatly restricted in its superficial extent.

Due to this restricted extent and with consideration of the type-dependent different amount of space required by the different memory chips—a 1-bit memory cell of a RAM requires about four times as much space as a 1-bit memory cell of an EEPROM, while the latter in turn requires four times as much as a 1-bit cell of a ROM—it is necessary to try and avoid using the area-intensive memory chips, i.e. in particular the RAM chips, and instead choose less area-intensive chips, such as an EEPROM or ROM. However, in order not to have to accept any functional losses from the desirable replacement of an area-intensive chip by a less area-intensive different one, the functionality of the originally used chip must be maintained.

Smart cards have a great variety of fields of application and purposes. Thus, so-called memory cards are used primarily as telephone cards or health insurance cards. Their functionality is limited to a specific application. Microprocessor cards, however, are characterized by an additional block of modules containing a CPU. Usually, these cards also have along with the CPU an I/O unit, a data, control and address bus, a volatile read-write memory (RAM), a nonvolatile read-write memory (EEPROM) and a a nonvolatile read-only memory (ROM). The operating system is stored mainly in the ROM.

In dependence on whether they access further programs besides the operating system, the cards are either designed only for one specific application stored in the ROM or can perform different tasks specified in the further user programs. This distinctly increases the functionality of the cards. With this gain in functionality, however, the demand for memory space also rises. For example, more registers for the data to be processed and more return addresses for the great number of subprograms must be provided in the RAM. In the cards common at present, however, the relevant area of the RAM, namely the area organized as a stack, is insufficient for more complex applications. Since the memory space of the area-intensive RAM chip cannot be expanded at will, as set forth above, the RAM limits the possible functionality range of the smart cards.

Newer smart cards have operating systems that permit reloading of executable program code. With this type of card, an application provider itself can execute with the smart card a program code that the operating system manufacturer does not know. So-called Java cards, for example, are based on programming in the language JAVA and on a so-called "Java virtual machine," which is a simulation of a Java processor that can be implemented on any sufficiently powerful processor. Java cards are thus platform-independent to a very large extent. However, Java has a high stack requirement due to the necessary virtual machine. The limited physical size of the RAM therefore limits the possibilities of the Java card.

DE 196 26 337 A1 discloses a method and apparatus for reading and processing messages from the outside world to be processed on a smart card. Messages to be processed that are received via the I/O unit can have a size that cannot be written completely to the RAM because of the memory space limitation. For security reasons, messages from outside must moreover be subjected to access authorization control by the CPU before they can be processed. A simple division of the messages into blocks of smaller size would make authentication unnecessarily elaborate and delay it. So that communication with the smart card is to a very large extent independent of the data size of the messages despite the RAM being too small, messages from outside are either stored directly in the EEPROM or indirectly in the EEPROM subsequent to intermediate storage in the RAM. The proposed solution is based on the approach of creating possibilities of intermediate storage for messages, or data, that cannot be stored completely in the RAM due to their size. The virtual memory enlargement is effected via the I/O buffer of the RAM, i.e. via the optionally writable part of the RAM. This print contains no hint of enlarging that area of the RAM that is organized as a stack.

EP 720 087 discloses the proposal to virtually enlarge a hardware stack by setting up an expansion memory. The expansion memory is to be set up in a defined area of the RAM. The oldest stack entries are moved to the expansion memory when the fill state of the hardware stack exceeds a limiting value that is just under the maximum capacity of the hardware stack. When the limiting value is reached the oldest stack entry is moved to the expansion memory. If the limiting value is still reached, the next-oldest stack entry is then also moved out. This known method ensures that the hardware stack is always at least almost completely usable so as to permit effective memory utilization. This distinguishes it from another known concept by which the hardware stack is divided into sectors and at each subroutine call a new sector is used through a sector rotation, a sector being moved to a memory if all sectors are occupied.

The method disclosed in EP 720 087 is not transferable to portable data carriers, however, because demand swapping of individual stack entries requires a fast memory and must therefore necessarily be implemented in the RAM. There is not enough space for this in the RAM on portable data carriers, specifically on smart cards.

The stack has a special organization in contrast to the other areas in the RAM. It constitutes a data structure that is implemented as a LIFO data structure (last in, first out) and fundamentally permits simpler management and access algorithms than the other memory areas of the RAM, which are randomly accessed. Swapping parts of the stack can therefore meet different criteria from those applicable with respect to the other part of the RAM.

The RAM of smart cards freely programmable in high level language is limited at present by the—still—customary 8-bit controller and typically includes 256 bytes of internal IRAM and 1600 bytes of extended XRAM that is addressable via address computations and therefore slightly slower.

The IRAM is normally used completely as a stack, while the XRAM contains the working memory and the I/O buffer.

The problem of the present invention is therefore to provide a method that permits virtual enlargement of the area of the RAM organized as a stack for a portable data carrier, in particular in the form of a smart card, so as to also permit execution of applications that would require a physically larger stack than is provided physically on the data carrier—while retaining the original computing power as completely as possible and adaptively taking account of the particular current system requirements—like the application software—and system balancing properties—like the access times to RAM and EEPROM, life of the EEPROM, etc.

A further problem is to provide a portable data carrier permitting execution of complex applications, in particular Java applets, that require an extended stack.

This problem is solved by a method having the following steps:
a) segmenting the stack into at least two stack segments,
b) detecting a fill parameter that describes a fill state for the stack,
c) monitoring the fill parameter by comparing the fill parameter detected in step b) with a predetermined limiting value,
d) swapping at least one stack segment to a further storage medium as soon as a predetermined relation between limiting value and fill parameters is reached.

Further, the problem is solved by a smart card wherein the operating system has means for segmenting the stack and swapping at least one segment of the RAM to a further memory, in particular to a nonvolatile read-write memory such as an EEPROM.

The stack is usually implemented as a LIFO data structure so that the last entry is processed first. Besides return addresses of subprograms, it contains local variables. The program stack is a stack in which the particular return addresses of the subprograms are stored at the call of subprograms. Upon execution of the program, the particular return addresses and the local variables of the subprogram are stored successively. In reverse order they are then required when the particular subprogram returns to the master program. Very old stack contents or return addresses occupy the stack memory space but are not currently required for executing the particular program. Therefore, blocks or segments of stack cells can be swapped to another, slower memory, for example the EEPROM. Only just before the current program must return to the higher program, the particular stack memory contents must be available again and are optionally swapped in again from the other storage medium. In the meantime the memory space of these stack cells can be used according to the invention for other records to be stored, e.g. for further return addresses and local variables. This method permits the stack to undergo virtual enlargement.

The invention exploits the fact that specifically the stack must expediently undergo virtual enlargement to permit the RAM to be most efficiently relieved as a whole. Due to the specific organization of the stack, an inventive swapping mechanism is applicable more effectively than in the memory areas of the RAM that are organized differently or not at all. If areas of the buffer were swapped, for example, higher access times to the swapped contents in the slower memory would have to be expected, since it is not foreseeable when which swapped buffer memory contents must be available in the RAM again when the latter is randomly accessed. It cannot be excluded that precisely the contents of the swapped cells must be available in the RAM again for the program run shortly after their swap. This results in a higher number of time-consuming accesses to the EEPROM. It can expediently be provided that the point of time for "being available in RAM" is precalculated when stack contents are swapped. This is possible due to the organization of the stack as a LIFO data structure.

An advantageous embodiment of the invention consists in the segmentation being done in powers of two $2^{n-m}$, where $m=1, 2, 3 \ldots 2^m$ is the number of segmentations and $2^n$ is the size of the stack according to memory cells or bytes. The dimension figure m for division is advantageously chosen so as to obtain optimal balancing o the smart card system, i.e. to take account of parameters stack, time for swapping segments in and out, additional o like size of the stack, time for swapping segments in and out, additional overhead for segment transfer, demand for stack memory space, etc., for the current application of the smart card. Segmentation is thus advantageously chosen based on parameters of the smart card system and in dependence on the application software, such as size, number of subprograms, etc. In a preferred segmentation, the segment size corresponds precisely to the size of the blocks of the EEPROM.

It thus results, for example, that a division or segmentation of the stack into two parts is most expedient for a first certain use of the smart card, so that the smart card system as a whole can guarantee an optimized run. For a further certain use of the smart card, a segmentation into several, smaller segments can be wiser, since this might for example obtain optimal system balancing more easily.

Advantageously, the inventive method also permits execution of smart card applications that require an especially large stack area, for example programs containing complex cryptographic algorithms or cards with Java applets. Here, users have the possibility of loading their specific programs onto the card. This advantageously increases the functionality of the card and its life, since e.g. program updates can be loaded onto the card.

In an alternative embodiment of the invention the lowest stack segment is not swapped to the EEPROM but to another nonvolatile read-write memory, such as a flash EEPROM or a FRAM (ferroelectric random access memory) or to an additional volatile read-write memory, for example a RAM, that is surface-optimized but thus has slower access times.

In one embodiment, in particular disadvantages in terms of time when swapping stack segments from the RAM with very fast access times to the EEPROM memory with substantially higher access times are avoided by previously preparing a stack balance. Thus, a segment is only swapped when a positive final balance results with consideration of the higher access times in relation to the stack area becoming free. To pre-prepare the stack balance, the application software can be tested on a simulator or a data flow analysis performed.

The choice of segmentation of the stack in powers of two $2^{n-m}$ results in the advantage that the fill parameter can be coded in a minimal number, namely (m), of address bits. This means that in case of a division into two, i.e. m=1, one address bit suffices to mark and recognize the change from one stack segment to the next. With a division of the stack into four parts, i.e. m=2, only two address bits are required.

BRIEF DESCRIPTION OF THE DRAWINGS

Further advantages and features of the invention will result from the following detailed description of the figures, in which:

FIG. 1 indicates schematically portable data carrier 10 for which the form of a smart card will be assumed hereinafter. Smart card 10 bears microcontroller 32 consisting of processor 12, I/O unit 14, volatile read-write memory 16, in particular in the form of RAM 16 (random access memory), nonvolatile read-write memory 18, in particular in the form of EEPROM 18 (electrical erasable programmable read-only memory), nonvolatile read-only memory 20, in particular in the form of ROM 20 (read-only memory), operating system 22 stored in memories 18 and 20, and data, control and address bus 24. Each memory 16, 18, 20 includes a multiplicity of 1-bit memory cells whose physical size depends on the type of memory.

DETAILED DESCRIPTION OF VARIOUS EMBODIMENTS

Figure 1:
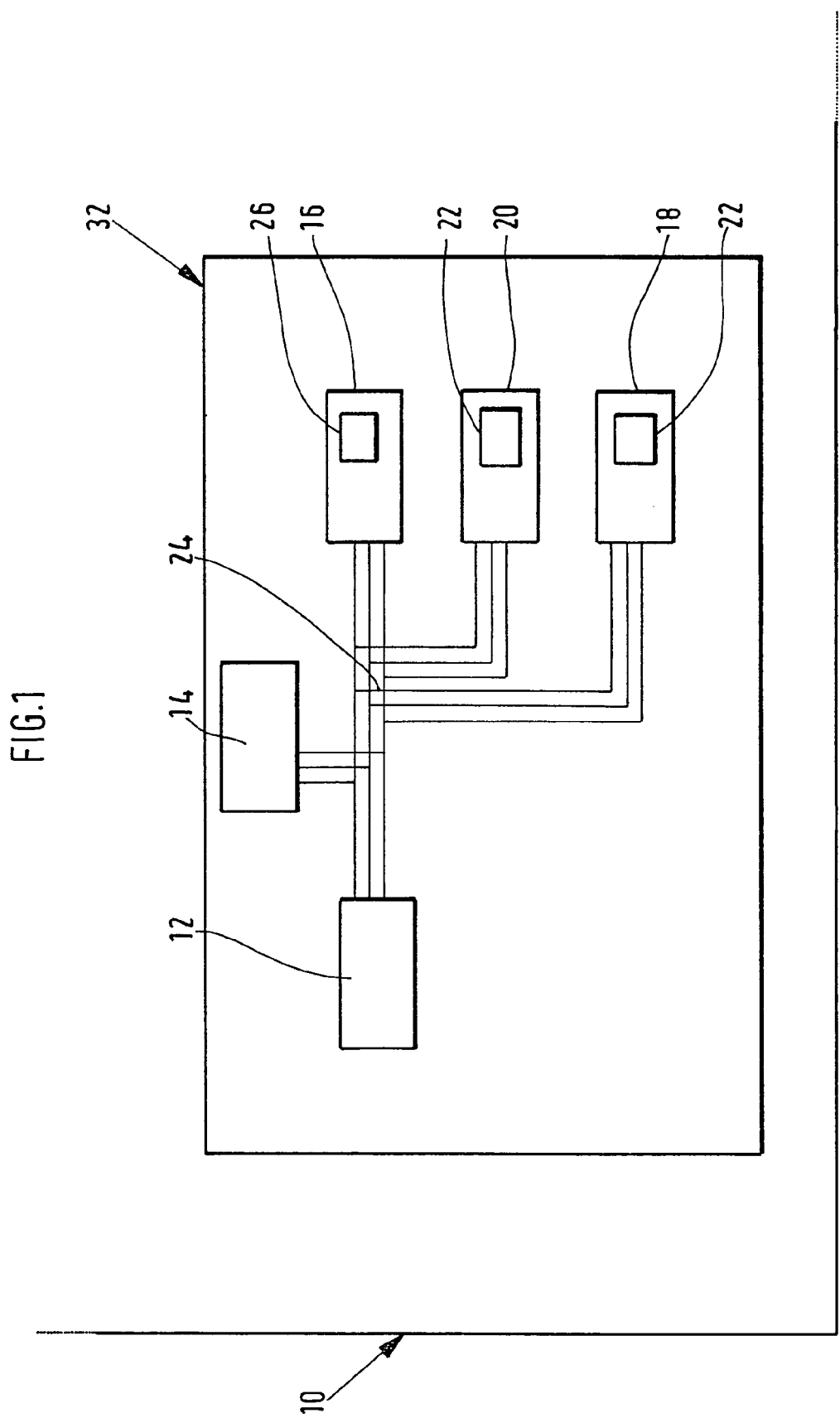
FIG. 1 shows a schematic representation of basic modules of an inventive microcontroller on a partially shown smart card.

RAM 16 is the working memory of the system. It is characterized by fast access times but is space-intensive with respect to the size of the memory cells and loses its contents as soon as the supply voltage is no longer present, even briefly. In common smart card systems with 8-bit controllers allowing free programming in high level language, the RAM consists e.g. of a 256-byte internal IRAM supplemented by an extended XRAM with typically 1600 bytes and addressable via address computations. Usually, RAM 16 is divided into different areas: an area for registers, stack 26, an area for variables and an area for I/O buffers, as well as a working area for complex algorithms, such as cryptographic algorithms.

Stack 26—as part of RAM 16—is implemented as a LIFO data structure. Further, it is divided into segments 30 each including a certain number of cells. In order to obtain a statement about a fill state of stack 26, stack pointer 28 is provided that points to the last stored entry, in particular the lowermost entry, in stack 26.

ROM 20 keeps the data even when no supply voltage is applied. Writing access to this memory chip is not possible. Here, mainly the operating system is stored.

EEPROM 18 is the most elaborate memory chip. It is divided into blocks each including a certain number of cells. At each write operation a block is written. The data are retained in the EEPROM even without power supply. However, it has very long access times since the writing time for EEPROM blocks is largely independent of the number of actually written bytes. Common writing times are in the range of 3 milliseconds per block.

In a preferred embodiment of the invention, an addressing of swapped stack segments 30 is solved via a destination address register that is preferably likewise stored in RAM 16. When segment 30 is swapped from stack 26 to EEPROM 18, the destination address register initialized with the initial address of EEPROM 18 is incremented. In the case assumed here, the address value is for example incremented by the size of the segment, i.e. by $2^{n-m}$. When further segment 30 is to be swapped in, this destination address register is again incremented by $2^{n-m}$ so that it always points to the newest segment. When swapped-in segment 30 is swapped out of the EEPROM in order to be available in stack 26 again, the destination address register is decremented, in the case assumed here for example by $2^{n-m}$.

In an alternative embodiment of the invention, the smart card has not only the abovementioned components but also additional components, such as a hardware-assisted memory management, a mathematical coprocessor, in particular for calculat-calculating public-key algorithms, a unit for error detection and correction in the EEPROM, a random generator, etc.

In an especially efficient embodiment of the invention, the method is implemented in hardware and thus substantially faster in execution than a software implementation. For this purpose, microcontroller 32 additionally has a page controller. The page controller is formed as a specific so-called memory managing unit (MMU) that has means for swapping stack segments 30 out and optionally in according to the inventive method.

If the inventive method is implemented in software, processor 12 together with operating system 22 are in charge of transferring stack segments 30.

Figure 2:
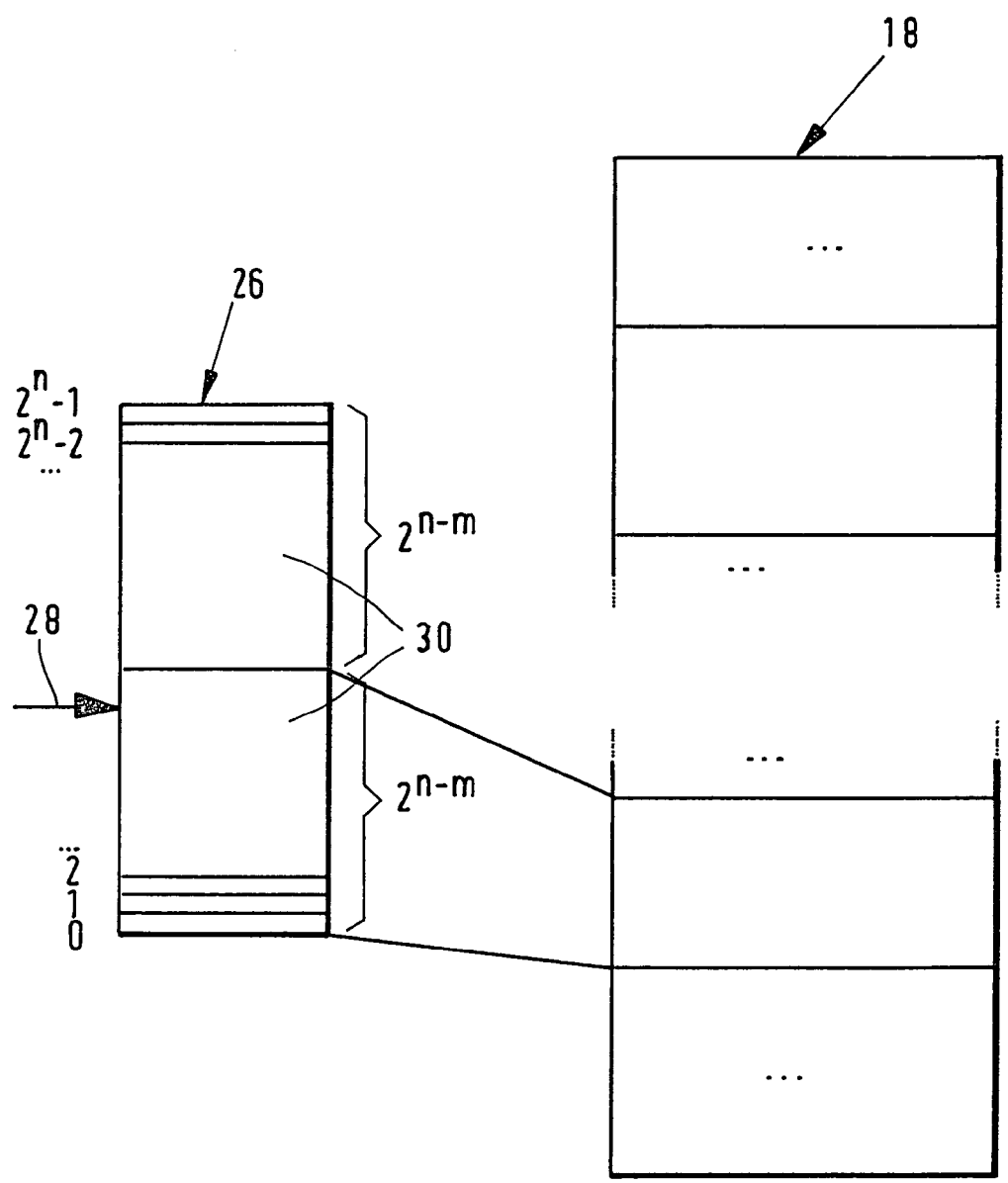
FIG. 2 shows a schematic representation of a stack segmented according to the invention.

In the following, the mode of functioning of the inventive method will be described with reference to FIG. 2.

During the run of a program the particular addresses for return of the subprograms to the hierarchically higher subprograms or to the master program are stored in stack 26 together with current local variables, the calculation results and the call parameters. The further the program runs, the larger the occupied area in stack 26 becomes. So that it is nevertheless possible to execute programs requiring a larger available area in stack 26 than would actually be physically present, individual segments 30 of stack 26 already written or occupied are swapped to a larger but slower memory, preferably EEPROM 18. Oldest written segment 30 is advantageously selected, which is required for the program execution again as late as possible.

When the program run is very advanced, some segments 30 are located in EEPROM 18. When there is now sufficient capacity as free memory space on stack 26 again and a swapped segment is to be accessed, swapped segments 30 are swapped back to stack 26 successively, individually or together. This swap back is advantageously executed such that the system parameters—such as duration of swapping in and out, frequency of access to the particular stack element, etc.—are optimally taken into account.

The swapping out and the swapping back of segments to be swapped are in each case effected segment by segment in one, interrelated transfer operation. Swapping out and swapping back in are expediently done using known block-by-block transfer instructions.

By suitable determination of limiting value GW and the size of segmentation, if the microcontroller is designed with additional MMU, the CPU can be prevented for example from being "stalled," i.e. the processor from having to first wait until the currently required stack element is loaded back from the EEPROM to stack 26.

A system property of smart cards due to the lack of their own source of energy makes it possible for the power supply of the card to be interrupted, e.g. by removal from the reader, while processing is ongoing, e.g. data being written to the EEPROM. The status of the momentarily processed data can then be indefinite. Data can in particular have been lost or transferred only partially to the memory. In particular, stack 26 located in the RAM, stack pointer 28 and the destination address register can be lost. This can give rise to, among other things, files that partly contain the new record and simultaneously partly the old record. This inconsistency would lead to application problems. In order to reliably avoid such inconsistencies, certain especially relevant actions are structured on the smart card into so-called atomic sequences, that is, sequences that are only executable completely or not at all according to the binary principle. Since the hardware of smart cards does not support atomic sequences, this principle must be implemented in software. It may be necessary to reserve certain areas in the RAM, in particular in the stack, virtually according to the invention to permit, for example, specific records to be processed as a whole and undivided.

If the smart card system, in particular the software in microcontroller 32, is designed to execute atomic operations, for example a specific byte code of a Java applet, then, in an advantageous alternative embodiment of the invention, the stack requirement can be previously determined and stored for example in a specially provided table. The management of the particular segments to be swapped out and in is then executed with reference to this table.

For a CPU stack available with physical limitations, the inventive method advantageously provides stack 26 of theoretically unlimited size.

So that the smart card system can control swapping out and in during the run of a program, information is provided that states the fill state of stack 26 of RAM 16. This is realized via a fill parameter, preferably in the form of stack pointer 28, that always points to the memory cells of stack 26 where the last entry was effected. With each new entry in stack 26, stack pointer 28 is incremented.

It can be optionally determined as of which fill state of stack 26 stack segment 30 is to be swapped out. In dependence on the particular application, it can be expedient for relatively large segments 30 to be swapped out only very rarely, e.g. in case of segmentation into two parts. On the other hand, a smaller subdivision can occasionally be more expedient, e.g. in the case of higher segmentation, whereby smaller segments are swapped out more frequently.

This extended designability of the inventive method is made possible by the definition of limiting value GW. It is preferably chosen so that optimal balancing of the total smart card system is guaranteed, i.e. the access times to the RAM and to EEPROM 18 are coordinated with each other, and the CPU computation time and additional memory requirement through the management, in particular the addressing of swapped segments 30, is taken into account. Limiting value GW is based on the size of a segment in a first expedient setting, so that oldest segment 30 is swapped out when the particular segment limit is exceeded. It is very expedient for the size of segment 30 to correspond precisely to the size of a block in EEPROM 18. Transfer of the stack segments between RAM 16 and EEPROM 18 can then be effected in time-optimized fashion by means of one block-by-block transfer instruction. In a further expedient setting, limiting value GW is set so as to correspond to a multiple of the segment size, so that a plurality of segments 30 are always swapped out simultaneously block by block. Segments 30 can then be swapped back into stack 26 as a block of segments 30 in the same way. Swapping back can likewise be effected singly segment by segment. In general, the number of segments swapped out in a step does not need to correspond does not need to correspond to the number of segments that is transferred back to stack 26 in a step. Only the sum of all transferred segments must be balanced.

Defining limiting value GW also makes it possible to take account of the life of the EEPROM 18 memory chip. EEPROMs allow only a technically limited number of write-erase cycles, the storage time becoming shorter the more often they are written and erased. Preferably, limiting value GW is therefore chosen so that the performance of the system is optimally coordinated with their lifetime.

In the preferred embodiment, the relation between limiting value GW and stack pointer 28 is selected so that it can be described by the relation "stack pointer $28 \leq$ limiting value GW." That is, as soon as the fill state of stack 26 rises above the predetermined segment size, oldest stack segment 30 is swapped out. Like the swapping out, the swapping back in of segments to RAM 16 is expediently also determined by a limiting value. This value can be identical with GW. The limiting value for the swapping back in of segments 30 can also be different from limiting value GW, in order to increase the variability of the inventive method. Further, modifications of this method are also expedient. For example, it can be advantageous in the case of short programs for swapping out not to be done immediately at the beginning of the program but only when stack pointer 28 denotes that stack 26 is almost completely full.

Usually, microcontroller 32 consists, in the main embodiment of inventive smart card 10, of memory chips RAM 16, ROM 20 and EEPROM 18. Individual blocks of stack 26 within RAM 16 are swapped out to EEPROM 18 according to the invention. Alternatively, microcontroller 32 consists of two RAM chips, RAM 16 and an additional RAM chip, and ROM 20. The additional RAM chip is area-optimized, but it has higher access times than RAM 16. According to the invention, segments 30 of stack 26 present in RAM 16 are then swapped to memory areas of the additional RAM chip.

What is claimed is:

1. A method for virtual enlargement of a data structure of a volatile read-write memory on a portable data carrier that is organized as a stack, wherein a fill parameter describing a fill state for the stack is detected and monitored by comparison with a predetermined limiting value (GW), and a part of the data structure is swapped out to a further storage medium located on the data carrier as soon as a predetermined relation between the limiting value (GW) and fill parameter is reached, the further storage medium being a nonvolatile read-write memory, the method comprising the steps:

a) segmenting the stack into at least two stack segments;
   b) effecting swapping of the segments to the further storage medium segment-by-segment;
   c) swapping in a stack segment swapped out in step b) to the stack as soon as a predetermined relation between said fill parameter and a predetermined second limiting value is reached;
   d) managing a destination address of each stack segment swapped out to the nonvolatile read-write memory in a register in the volatile read-write memory, the destination address being incremented by an integral multiple of the segment size with each newly swapped out stack segment and decremented by an integral multiple of the segment size with each stack segment swapped back to the stack.

2. The method according to claim 1, wherein in the segmenting step segmentation is effected into segments with the size $2^{n-m}$, where m=1,2,3 . . . , $2^m$ is equal to a number of segmentations, and $2^n$ is equal to a size of the stack, and m is chosen so as to obtain optimal balancing of the data carrier system.

3. The method according to claim 2, wherein the limiting value (GW) matches the size of the segment, namely $2^{n-m}$, or an integral multiple of the segment size.

4. The method according to claim 2,
wherein the second limiting value matches the size of the segment, namely $2^{n-m}$, or an integral multiple of the segment size.

5. The method according to claim 2,
wherein the limiting value (GW) and the second limiting value match the size of the segment, namely $2^{n-m}$, or an integral multiple of the segment size.

6. The method according to claim 1, wherein the relation between the limiting value (GW) and the fill parameter is described by the following relation: "fill parameter≦limiting value."

7. The method according to claim 1, wherein swapping out of each stack segment in step b) is effected by means of known block-by-block transfer instructions.

8. The method according to claim 1, wherein the fill parameter comprises a stack pointer.

9. The method according to claim 1, wherein the stack segments are swapped out in step b) in order of the oldest to newest.

10. The method according to claim 1, wherein each swapped out stack segment is provided with return addresses of subprograms, local variables, intermediate results and/or call parameters.

11. The method according to claim 1, wherein swapping in of each stack segment in step c) is effected by means of known block-by-block transfer instructions.

12. The method according to claim 1, including the step of carrying out implementation of the recited method by using hardware including a page controller.

13. A portable data carrier comprising a microcontroller including at least a processor, an I/O unit, at least one volatile read-write memory with a stack, at least one nonvolatile memory, an operating system and a data control and address bus, wherein the operating system includes means for segmenting the stack and for swapping out at least one segment of the volatile read-write memory to the nonvolatile memory when a predetermined fill state is exceeded.

14. The portable data carrier according to claim 13, wherein the nonvolatile memory is a nonvolatile read-write memory.

15. The portable data carrier according to claim 13, wherein the microcontroller includes a page controller adapted to carry out a method according to claim 1 for swapping out a segment to the nonvolatile memory.

16. A portable data carrier according to claim 13, said carrier configured as a smart card, and including an operating system arranged to permit loading into the smart card executable programs.

* * * * *